United States Patent [19]

Paine et al.

[11] Patent Number: 5,455,315

[45] Date of Patent: Oct. 3, 1995

[54] EMULSION POLYMERIZATION PROCESSES AND TONERS THEREOF

[75] Inventors: Anthony J. Paine, Mississauga; Kevin J. O'Callaghan; Alfred Rudin, both of Waterloo, all of Canada

[73] Assignee: Xerox Corporation, Stamford, Conn.

[21] Appl. No.: 254,728

[22] Filed: Jun. 6, 1994

[51] Int. Cl.$^6$ .................................................. C08F 2/22
[52] U.S. Cl. ........................ 526/79; 526/80; 525/309; 430/109; 430/137; 430/904
[58] Field of Search .................. 526/79, 80; 525/309; 430/109, 137, 904

[56] References Cited

U.S. PATENT DOCUMENTS

| | | | |
|---|---|---|---|
| 4,226,752 | 10/1980 | Erickson et al. | 525/309 |
| 4,626,489 | 12/1986 | Hyosu | 430/137 |
| 4,703,090 | 10/1987 | Ferraresi et al. | 525/246 |
| 4,935,469 | 6/1990 | Akasaki et al. | 525/309 |
| 5,216,065 | 6/1993 | Colyer et al. | 526/79 |
| 5,219,943 | 6/1993 | Akasaki et al. | 525/273 |
| 5,273,824 | 12/1993 | Hashino et al. | 428/402.24 |
| 5,286,801 | 2/1994 | Besecke et al. | 525/309 |

Primary Examiner—Joseph L. Schofer
Assistant Examiner—Tom Weber

[57] ABSTRACT

An in situ process for the preparation of resin particles comprising: preparing a seed particle latex by aqueous emulsion polymerization of a first mixture comprised of at least one monomer, an optional chain transfer agent, and a water soluble free radical initiator, wherein the reaction of the free radical initiator and monomer produces oligomeric radicals which provide in situ stabilization to the resulting first generation seed particles; optionally diluting the first seed particle latex with water; heating and starve feed adding to the first generation seed particles a second mixture comprised of at least one monomer, an organic soluble free radical initiator, an optional chain transfer agent, an optional water soluble free radical initiator, and an optional surfactant to form a third mixture comprised of second generation seed particles; heating and starve feed adding to the second generation seed particles additional said second mixture to form a fourth mixture comprised of third generation seed particles; heating and starve feed adding to the third generation seed particles additional said second mixture to form a fifth mixture comprised of fourth generation seed particles; and heating and starve feed adding to the fourth generation seed particles additional said second mixture to form a sixth mixture comprised of fifth generation seed particles.

29 Claims, 2 Drawing Sheets

EMULSION POLYMERIZATION PROCESSES AND TONERS THEREOF

CROSS REFERENCE TO COPENDING APPLICATIONS AND RELATED PATENTS

Attention is directed to commonly assigned application U.S. Ser. No. 910,803 filed Jun. 9, 1992, entitled "METHOD OF PREPARING A STABLE COLLOID OF SUBMICRON PARTICLES," now U.S. Pat. No. 5,362,417; U.S. Ser. No. 08/214,518 filed Mar. 18, 1994, entitled "EMULSION POLYMERIZATION PROCESSES AND TONER COMPOSITIONS THEREFROM," pending, and U.S. Ser. No. 08/037,192 filed Mar. 23, 1993, entitled "SEMISUSPENSION POLYMERIZATION PROCESSES," pending.

Also, attention is directed to commonly assigned U.S. Pat. No. 5,278,020 issued Jan. 11, 1994, entitled "TONER COMPOSITION AND PROCESSES THEREOF"; and U.S. Pat. No. 5,322,912, entitled "POLYMERIZATION PROCESSES AND THEIR TONER COMPOSITIONS THEREFROM".

The disclosure of the above mentioned patents and applications are incorporated herein by reference in their entirety.

BACKGROUND OF THE INVENTION

This invention is generally directed to processes for the preparation of monodisperse polymeric particles and in situ toner compositions thereof, and more specifically the present invention is directed to starve fed or semi-batch emulsion polymerization processes for the preparation of monodisperse polymeric particles suitable for use in xerographic toner and liquid ink formulations. The polymeric particle compositions of the present invention in embodiments contain additionally optional colorants or magnetic pigment particles. In other embodiments, monodisperse polymeric particle compositions are prepared by processes of the present invention which have a core and shell structure comprised of different polymeric resins wherein the shell resins possess a higher glass transition ($T_g$) temperature than the core resin and enables the separation and independent regulation of toner blocking and fusing functions. The monodisperse polymeric particle compositions of the present invention in embodiments, can be prepared by processes comprising performing a series of sequential emulsion polymerization reactions using starve feed emulsion polymerization. In embodiments, a first emulsion polymerization is accomplished to form very small submicron sized primary seed particles. The seed particles are then used as the starting point in subsequent growth steps to grow larger sized particles. The particle size distribution of successive generations of particles is essentially constant and monodisperse.

The resulting polymer particle compositions of the present invention are useful in a variety of applications, for example, for color or magnetic imaging and printing with dry and liquid developer compositions for electrophotography. These toner materials can be produced without the need for energy and capital intensive conventional multi-step post polymerization processing including for example compounding, jetting, and classification.

An important problem which has limited the preparation and maintenance of submicron polymeric materials by emulsion polymerization is the tendency of the initially formed small polymeric particles to agglomerate with one another which leads to undesirable broad particle size distributions and larger particle sizes.

In one prior approach directed at overcoming the aforementioned agglomeration problem there has been used protective colloids, for example, polymeric stabilizers or emulsifiers such as polyvinyl alcohol or complex polysaccharides such a TYLOSE™. While polymeric stabilizers were effective in preventing agglomeration of the polymeric particles, the resulting particle size distributions were broad and the stabilizers are responsible for interfering with the charging and fusing properties, and humidity sensitivity of the resulting toner particles.

Polymerization techniques such as suspension and dispersion polymerization, or techniques such as precipitation or emulsion agglomeration are capable of generating homogeneous particles of a variety of copolymers. In the suspension polymerization process, an oil phase of monomer, colorant and initiator are emulsified into an aqueous surfactant solution to produce droplets which are subsequently heated to induce polymerization. In the dispersion polymerization process, an initially homogeneous mixture of monomer, initiator, steric stabilizer and solvent is heated to induce polymerization. The solvent is selected so that the steric stabilizer chains are soluble but the polymer being formed is insoluble, so particles with surface grafted steric stabilizer are formed. Although monodisperse particles can often be obtained, problems with this process include the need for a non-aqueous solvent and the inability to conveniently make copolymers while retaining the monodisperse size distribution. The product particles from precipitation processes are similar to those from dispersion polymerization, but they are formed by dissolving a polymer and graft or block stabilizer in a good solvent for both, then precipitating the polymer by adding a non-solvent for it which is a good solvent for one of the stabilizer blocks. Size distributions are extremely broad, however, and the reactor throughput or percent solids is low.

One major current use of emulsion polymers is in emulsion/agglomeration processes. In this process, submicron copolymer particles of 100 to about 200 nm are formed by traditional emulsion polymerization techniques, and then agglomerated together with pigment to form toner sized particles. However, the process has the following major disadvantages: some emulsions are difficult to agglomerate and do not coalesce into suitable toner particles, because of their charge properties, $T_g$, or for other unknown reasons; the size distribution is not always narrow; and the process requires separate emulsion polymerization and agglomeration process steps.

The following references are mentioned:

U.S. Pat. No. 5,219,943, issued Jun. 15, 1993, to Akasaki et al., discloses a process for producing monodispersed fine particles of a vinyl polymer which comprises polymerizing monomers containing at least one vinyl monomer selected from the group consisting of aromatic vinyl compounds, acrylic esters, and a methacrylic ester in the presence of (1) a surface active agent represented by formula (I) wherein $R_1$ and $R_2$, which may be the same or different, each presents a substituted or unsubstituted alkyl group having from 4 to 8 carbon atoms, a substituted or unsubstituted phenyl group, or a substituted or unsubstituted cyclohexyl group and M represents an alkali metal, (2) from $10^{-3}$ to $10^{-1}$ mol/L of a persulfate as a polymerization initiator, and (3) from $10^{-4}$ to $10^{-2}$ mol/L of a divalent metal sulfate as an electrolyte. Monodispersed vinyl polymer fine particles having particle size of 1 micron or greater with a very narrow size distribution are obtained.

U.S. Pat. No. 4,703,090, issued to Ferraresi et al., discloses a method for preparing graft copolymers by means of a two-step polymerization in emulsion: in the first step a vinyl aromatic monomer and an acryl or methacryl monomer are grafted on a monomodal polybutadiene latex constituted of particles of diameter comprised within the range of from 800 to 2,500 Angstroms. The polymerization/grafting reaction is continued up to a 70–90% conversion, at which time a further portion of monomodal polybutadiene is added, together with further amounts of said monomers, always in emulsion.

U.S. Pat. No. 4,626,489, issued Dec. 2, 1986, to Hyosu discloses a polymerizable mixture containing a monomer, a polymerization initiator and a colorant which is subjected to suspension polymerization, and an additional monomer is adsorbed onto the resultant polymer particles and grown by the polymerization in the presence of an oil-soluble polymerization initiator to give a toner for development of electrostatic charges excellent in toner characteristics such as triboelectric charging characteristic, storage stability and free flowing property.

U.S. Pat. No. 5,273,824 issued Dec. 28, 1993 to Hoshino et al., discloses a cored multi-shell emulsion particle consisting of a core particle, a void layer existing in the exterior of the core particle and a shell layer, each of which has a diameter of $\Phi$, d and D, respectively, and the ratio of $\Phi$, d and D is in the following range $\Phi/D=0.1-0.6$ $d/D=.2=0.8\ (d>\Phi)$ The particle exhibits excellent hiding power, brightness, gloss and thermal insulation property as an organic pigment without impairing drying ability and strength of coated layer.

Other disclosures of emulsion polymerizations for forming small particles are generally known, but indications are that numerous problems exist, such as: only submicron particles, for example, less than 1.0 micron, can be formed; use of insufficient surfactant concentrations leads to emulsion or latex instability which in turn produces particle agglomeration; and 3) use of excessive surfactant concentrations leads to considerable secondary particle formation and broadened particle dispersities. The present intention overcomes or minimizes these and other problems by providing a means for controllably growing seed latex particles by regulating the ratio of water soluble to oil soluble free radical initiator in stepwise particle growth processes and by providing for in situ particle stabilization thereby minimizing or eliminating the use of exogenous surfactant stabilizers. The present invention also provides for, in embodiments, the capability to prepare toner sized particles which possess a encapsulated structure wherein theologically dissimilar resins are used for the particle core and encapsulating shell to control toner particle melt rheology(core) from toner blocking (shell) properties.

Other references of interest include: U.S. Pat. Nos. 4,996,127; 4,797,339; 4,876,313; and 4,983,488.

There remains a need for economic and convenient processes of obtaining very small particles with narrow particle size distribution properties, and more specifically micron and submicron polymeric particles, without the complications and disadvantages of the aforementioned prior art materials and processes. Further, there is a need for convenient means for preparing homogeneous polymeric particles and heterogeneous or encapsulated polymeric particles without the need of having to resort to intensive and expensive particle size reduction, comminution, or classification processes for obtaining clean, optionally dry and small polymeric particles, for example, from less than about 0.1 to about 10 microns in volume average diameter as determined by a scanning electron microscope, Coulter Counter Multisizer II or disc centrifuge particle size analyzer. Still further, there is a need for particle preparative processes that permit low cost, clean, and optionally dry micron and submicron polymeric particles that can be selected as liquid and dry electrophotographic developer compositions, carrier powder coatings, photoconductor pigment or resin coating suspensions, and as toner particles and toner additives for enhanced photoreceptor development and cleaning.

SUMMARY OF THE INVENTION

It is an object of this invention to overcome these and other difficulties encountered in the art and provide processes for preparing highly colored and magnetic polymeric particles with many of the advantages illustrated herein.

In another object of the present invention there are provided processes for the formation of polymeric particles, and more specifically polymeric particles which are useful for the preparation of dry and liquid magnetic developer formulations.

Yet, in another object of the present invention there are provided simple and economical processes for the formation of particles which do not require additional mechanical processing such as crushing, grinding or micronizing to reduce the particle size prior to using in toner and ink formulations.

Another object of the present invention resides in the provision of simple and economical processes for the preparation of low cost, clean, that is substantially no impurities, and well defined size distribution of highly pigmented and or highly magnetic polymeric particles, especially polymeric particles for liquid and dry electrophotographic developer compositions.

Another object of the present invention resides in simple and economical preparative processes for the preparation of low cost, clean, well defined particle size distribution of small highly pigmented and highly magnetic colored polymeric particles, and more specifically submicron to micron sized polymeric particles useful for liquid or dry electrophotographic developers.

In another object of the present invention resides in the provision of preparative processes which enable the formation of toner sized particles by emulsion polymerization wherein the resulting latex particles may be formed with high solids content, for example, about 30 weight percent solids, and in excess of 50 weight percent solids, if desired upon concentration, and which processes may be accomplished over relatively short reaction periods, for example, of about several hours or less.

Further, another object of the present invention resides in simple and economical processes for producing a low cost, clean and well defined particle size distribution of particles especially polymeric particles useful as toners, toner additives, liquid immersion development ink particles, and magnetic photoreceptor additives.

In yet another object of the present invention resides the ability to economically prepare encapsulated or core-shell resin toner particles wherein the fusing and blocking properties of the toner may be separately controlled by the different properties of the core and shell resins, respectively.

Additionally, in another object of the present invention there are provided, as a result of the enhanced degree of control and flexibility, stepwise and continuous resin particle growth processes for the preparation of finely divided polymeric particles with improved particle size distribution and pigmentation properties.

In another process embodiment of the present invention, the monomer or monomers used in at least one subsequent second mixture addition, and preferably the last of final monomer addition step, are selected to be different from the monomer or monomers of the first mixture or any preceding monomer addition thereby enabling the formation of core resin particles with polymeric layers or encapsulating coatings or shells thereover, and which coatings or shells possess higher glass transitions temperatures than the core resins.

In other embodiments of the present invention the particles prepared may be used, directly or following isolation and reformulation into a suitable carrier fluid liquid, as a liquid developer composition suitable for use in, for example, liquid immersion development(LID) applications. Alternatively, the particle dispersions may be dried by known conventional means to provide dry non-blocking and non-agglomerating xerographic toner particles.

Still in embodiments of the present invention the particles prepared may be conveniently colored either in situ during the particle growth stages or colored following isolation.

These and other objects of the present invention are accomplished, in embodiments, by providing stepwise processes for the preparation of in situ toner particles comprising: preparing a seed particle latex by aqueous emulsion polymerization of a mixture comprised of at least one free radical addition polymerizable monomer, an optional chain transfer agent, an optional surfactant, and a water soluble free radical initiator, wherein the reaction product of the free radical initiator and monomer produces oligomeric radicals which provide stabilization to the resulting first generation seed particles; optionally diluting the seed particle latex with water; heating and adding to the seed particle latex under starve feed addition conditions a second mixture comprised of at least one monomer, an organic soluble free radical initiator, an optional chain transfer agent, an optional water soluble free radical initiator, and an optional surfactant to form a third mixture comprised of second generation particles; and repeating the previous heating and addition step, up to about 1 to about 10 times, followed by optional coloration or isolation of the resulting monodisperse particles. In other embodiments are provided continuous processes for the preparation of resin particles comprising: preparing a seed particle latex by aqueous emulsion polymerization of a first mixture comprised of at least one monomer, an optional chain transfer agent, and a water soluble free radical initiator, wherein a monodisperse first generation of seed particles result; optionally diluting the first seed particle latex with water; heating and continuously starve feeding to the first generation seed particles a second mixture comprised of at least one monomer, an organic soluble free radical initiator, an optional chain transfer agent, an optional water soluble free radical initiator, and an optional surfactant to form a third mixture comprised of second generation particles; and optionally isolating the resulting toner particles from the third mixture and wherein the toner particles have a diameter average particle size from about 200 nanometer to about 20 microns and a volume average dispersity of less than about 1.3.

DETAILED DESCRIPTION OF THE INVENTION

Emulsion polymerization and monodisperse toner particle formation processes of the present invention employ starve feed emulsion polymerization (SFEP) to accomplish the synthesis of successive generations of seed particles. Seed particles are subsequently grown or enlarged in a series of starve fed polymerizations to give final particles of about 2 to about 8 microns with very narrow or monodisperse particle size distributions. During a starve fed polymerization, a feed mixture containing monomer(s), initiator(s), and optional surfactant(s), and optional chain transfer agent(s), is added at a relatively slow and constant rate of about 0.1 gram per kilogram of reactor content per minute to about 25 grams per kilogram of reactor content per minute. Starved conditions occur when the monomer is consumed by polymerization at about the same rate as it is added, most preferably in the range of about 1 gram per kilogram of reactor content per minute to about 10 grams per kilogram of reactor content per minute to the emulsion polymerization reaction.

Pigments, dyes, carbon black or magnetite colorants can be added at any stage of the process, or the final resin particles may be colored by known post particle coloration processes. Since certain aforementioned colorants, such as carbon black, may interfere with free radical polymerization processes, the colorants may be optionally surface treated with passivating compounds or coatings prior to the coloration step.

Emulsion polymerizations of the present invention are conducted in aqueous media containing an optional suitable surfactant, monomer droplets or previously formed monodisperse resin particles, and typically either a water soluble initiator or monomer soluble initiator or both. In some cases an optional small amount of previously prepared "seed" particles may be employed to improve the reproducibility and degree of control of the polymerization reaction. In other seeded reactions, monomer addition may be controlled to prevent the formation of separate or "secondary" monomer droplets while promoting the swelling of existing particles. Depending on the conditions, initiators, monomers, and polymer selected, there may result numerous systems within the extremes of: a) suspension polymerization where the polymer particles formed are homogeneous, as in emulsion/suspension polymerization and b) encapsulation processes, and wherein composite particles are formed with exterior shells of a higher $T_g$ than the interior cores by programming the order of addition of different monomers.

Processes of the present invention offer, in embodiments, several unique features and advantages, as disclosed hereinafter. The polymerization of added monomers occurs at a sufficiently fast rate that the monomer concentration in the reactor is nearly always low and at a steady state. This condition preserves the composition of the polymers or copolymer formed which condition is unlike batch and bulk copolymerizations, or swelling processes described by Ugelstadt, in *Advances in Colloid and Interface Science*, Volume 13, p. 101 (1980), or *Progress in Polymer Science*, Volume 17, p. 87 (1992) in which one monomer preferentially polymerizes, causing compositional drift with time. Thus in embodiments of the present invention the product resin particles will have both the desired particle size and particle size distribution properties, and the desired toner fusing properties.

The process enlarges the useful materials space available for toner copolymer synthesis and toner compositions, since one is not restricted to combinations of process and monomer in which the copolymerization ratios are nearly unity, for example, styrene/n-butylmethacrylate in bulk polymerization; styrene/n-butyl acrylate in emulsion polymerization; styrene/butadiene in suspension polymerization.

In embodiments, the present process does not require a polymeric surfactant, which is preferably avoided, so that the triboelectrical and fusing properties of the resulting toners are not limited by problems that plague the aforementioned colloidally stabilized systems, for example, grafting reactions to polymeric stabilizer are avoided.

The SFEP process can be conducted at high solids content of, for example, about 30 percent by weight or greater of the total weight of polymerization ingredients and requires relatively short reactions times, of for example, several hours. Thus, reactor throughput of processes of the present invention are comparable to other in situ processes, even though several distinct growth or particle enlargement steps may be required. It is also possible in embodiments of the present invention to conduct continuous growth processes which reduce the total number of steps required to achieve the desired particle size and distribution properties.

Processes of the present invention avoid the known complexities and difficulties associated with the agglomeration of the particles in scaled up emulsion aggregation processes, for example, the high viscosity of the gel formed by adding a cationic surfactant, reference for example the aforementioned U.S. Pat. Nos. 4,996,127; 4,797,339; 4,876,313; and 4,983,488.

Emulsion aggregation is an alternative method for the preparation of toner sized particles comprising preparing a submicron polymer latex by standard methods, and then gelling the latex by the addition of cationic surfactant. When the gel is stirred under shear, it rearranges to toner sized aggregates with particle size distributions of GSD=1.15 to 2.0. The aggregates can be coalesced into spherical or lumpy particles by heating above the polymer $T_g$. Processes of the present invention avoid the known complexities of this process, including the need to use large amounts of anionic and nonionic surfactant, the need to work at low solids content of about 10% by weight due to the high viscosity of the gel, and the tendency for the agglomerates to either coalesce uncontrollably and catastrophically or to disassociate into original particles under some conditions. In addition, the processes of the present invention give a toner product with much narrower size distribution if desired of, for example, about GSD=1.01 to 1.03.

The starve feed based emulsion polymerization processes of the present invention are easily scaled up without problems caused by, for example, dangerous exotherms that are common to batch emulsion polymerization processes, and with little or no change in the compositional or rheological properties of the product resin.

Starve feed or semi-batch reaction conditions of present invention comprise slowly admitting one or more reactants to the reaction vessel, for example monomers, which mix with another reactant already present in the reactor, for example the free radical initiator. An alternative expression used to describe the addition process used in the present invention is continuous monomer addition which involves charging an initial emulsion into a reactor and continuously feeding, for example, a polymerization catalyst or initiator and a monomer in precise quantities, wherein the reaction ensues nearly instantaneously and completely upon exposure to the reaction conditions, for example, heating as in the present invention.

Emulsion polymerization processes of the present invention provide primary particle populations which are homogeneous and are comprised of monodisperse particle size distributions and contain little, for example, less than 5%, if any, secondary particle populations.

Reactive monomers suitable for use in the present invention include any unsaturated compound which reacts with free radical initiator compounds or propagating free radical chain species, and are used in an amount of about 1 to about 98 weight percent based on the total weight of polymerization reaction components used in a given particle formation or growth step of the present process. The monomer or monomers used in the formation of the first seed latex are substantially water insoluble, generally hydrophobic, and can be readily dispersed in the aqueous phase with adequate stirring when added to the reaction vessel. The dispersal of the reactive monomers in the preparation of the first seed latex particles are further enhanced and assisted by in situ stabilization or oligosurfactant formation resulting from the free radical addition reaction of the water soluble initiator, such as persulfate, to the added reactive monomers. Optionally, anionic, nonionic, or cationic surfactant may be used to assist the dispersion process.

Examples of monomers that can be used include any monomer capable of undergoing a free radical polymerization and include but are not limited to styrene, substituted styrenes and derivatives thereof, for example, methylstyrene, acrylates, methacrylates, butadiene, isoprene and any conjugated diene monomer sufficiently reactive under the reaction conditions to afford a free radical addition reaction polymer product.

Processes of the instant invention, in embodiments, provide for resins with weight average molecular weights over the range of from about 2,000 to about 200,000, and preferably from about 5,000 to about 70,000. The processes of the present invention can be selected to form a wide variety of polymers. For example, the present processes can be selected to polymerize a styrene monomer to form polystyrene or butadiene to form polybutadiene. The process of the present invention can be selected to polymerize a mixture of two or more different polymerizable monomers to form copolymers therefrom, for example, polymerization of styrene and butadiene to form poly(styrene-butadiene), styrene and isoprene to form poly(styrene-isoprene), styrene and acrylate to form poly(styrene-acrylate), styrene and methyl methacrylate to form poly(styrene-methyl methacrylate), and the like, and combinations thereof, including copolymers and terpolymers. Preferred resins formed by processes of the present invention include those thermoplastic polymers and copolymers which have a glass transition temperature of from about 20° to about 90° C., such as the commercially available resins PLIOLITE® and PLIOTONE®.

Preferred resins for use in core-shell composite particles of the present invention have a $T_g$ of about 20° to about 50° C. and are particularly suited for use in the core, and resins with a $T_g$ of about 40° to about 90° C. which are particularly suited for use in the shell.

The free radical initiator can be any free radical polymerization initiator capable of initiating a free radical polymerization process. The organic soluble free radical initiator can be selected from a large class, including organic peroxide initiators such as benzoyl peroxide and lauroyl peroxide, and azo initiators such as azobisisobutyronitrile, and the like. The initiator concentration employed is about 0.2 to about 5 weight percent, of the total weight of monomer to be polymerized and is determined by the desired molecular weight of the resin. As the initiator concentration is decreased relative to the weight of molar equivalents of monomer used, the molecular weight of the thermoplastic resin product generally increases. Free radical initiators useful in the present invention include any free radical initiator that is capable of providing free radical species upon heating to above about 40° C. Preferred free radical initiators for use in the primary particle generation or seed latex formation include those initiators which have a high water solubility characteristic. The reaction of the water soluble free radical compound with the initial monomer mixture provides oligomeric radical species resembling or reminiscent of surfactant stabilizers which provide high levels of ionic or charge stabilization to the freshly nucleated polymeric seed particles and monomer droplet mixture and thereby prevents the seed particles and monomer droplets from aggregating or agglomerating in the absence of added surfactant.

Water soluble free radical initiators or polymerization initiators employed in the processes of the present invention are those that are traditionally used in emulsion polymerization reactions and which provide a water soluble or polar phase compatible functional group upon reaction with the monomers. Examples of water soluble free radical initiators are persulfates, water soluble peroxides and hydroperoxides; more specifically, sodium, potassium and ammonium persulfates, hydrogen peroxide, t-butyl hydroperoxide, cumene hydroperoxide, para-menthane hydroperoxide, and peroxy carbonates. Other water soluble initiators of similar decomposition mechanism may be used if desired, for example, azo compounds such as 4,4'-azobis(4-cyanovaleric acid); 1,1'-azobis(1-methylbutyronitrile-3-sodium sulfonate); 2,2'-azobis(2-amidinoprpane)dihydrochloride; 2,2'-azobis(2-amidinopropane) dihydrochloride; 2,2'-azobisisobutyl amide dihydrate; 2,2'-azobis[2-(2-imidazolin- 2-yl)propane] dihydrochloride; and 2,2'-azobis[2-(5-methyl-2imidazolin-2-yl)propane]dihydrochloride.

Alternatively, water soluble redox polymerization initiators may be selected as the polymerization initiator. Examples of useful water soluble redox polymerization initiators comprise combinations of a reducing agent and a peroxide, the peroxides comprising for example, persulfate salts, hydrogen peroxide, hydroperoxides, and the like. As an example, combinations such as hydrogen peroxide and a ferrous salt may be used as well as a persulfate salt and sodium hydrogen sulfite or cumene hydroperoxide and a ferrous salt as well as a reducing agent in combination with sodium perchlorate. The redox polymerization initiators are particularly preferred when it is desired to avoid or minimize the extent and duration of the heating required for polymerization.

Preferred free radical initiators for use in subsequent particle growth or enlargement steps or stages include those initiators which have a high organic phase solubility and low water or aqueous phase solubility characteristic for the following reasons. The organic or monomer soluble free radical initiators are used optionally in combination with water soluble initiators to provide a balance between high levels of polymer initiation and propagation in the organic phase and an acceptable level of the aforementioned in situ generated surfactant stabilization to the growing particles thereby obviating or minimizing the amount of exogenous surfactant added. Organic soluble free radical compounds are preferably selected in subsequent particle growth or enlargement steps so as to concentrate the reaction of monomer that is forming polymer in the monomer phase which is preferably at or within the surface of the growing particles and thereby minimizes or eliminates the aforementioned undesired secondary particle population formation. However, some water soluble initiator may be required to generate additional charged surface groups, depending on the quantity of exogenous surfactant added. With little or no exogenous surfactant added, some water soluble initiator is often required. In embodiments, with added surfactant in amount of greater than about 0.2% by weight of the monomer content, the water soluble initiator may not be required. Free radical initiators are selected in amounts of from about 0.1 to about 10 weight percent based upon the total weight of monomer that is polymerized in a given particle formation or growth step.

Surfactants selected for use in the present invention include any known surfactants which produce sufficient emulsification and dispersion of the discontinuous phase ingredients. Examples of preferred emulsifying agents are anionic surfactants such as alkyl sulfonate, alkyl aryl sulfonates, condensed naphthalene sulfonates, alkyl sulfates, ethoxylated sulfates, phosphate esters and esters of sulfosuccinic acid. Representative of these surfactants are sodium alpha-olefin ($C_{14}$–$C_{16}$) sulfonates, alkali metal or ammonium dodecylbenzene sulfonate, disodium dodecyl diphenyloxide disulfonate, disodium palmityl diphenyloxide disulfonate, sodium potassium or ammonium linear alkyl benzene sulfonate, sodium lauryl sulfate, ammonium alkyl phenolethoxylate sulfate, ammonium or sodium lauryl ether sulfate, ammonium alkyl ether sulfate, sodium alkyl ether sulfate, sodium dihexyl sulfosuccinate, sodium dicyclohexylsulfosuccinate, sodium diamyl sulfosuccinate, sodium diisobutylsulfosuccinate, disodium ethoxylated nonyl phenol half ester of sulfosuccinic acid, tetra sodium N, (1,2-dicarboxyethyl)-N-octadecyl sulfosuccinate, disodium isodecyl sulfosuccinate, sodium bistridecyl sulfosuccinate, sodium salt of alkyl aryl polyether sulfate, lauryl alcohol ether sulfate, sodium salt of condensed naphthalene sulfonic acid, complex phosphate ester of ethylene oxide adduct and mixtures thereof. Preferred surfactants are those which have a relatively low molecular weight and high water solubility to facilitate removal if desired, for example, sodium dodecylbenzene sulfonate and sodium dodecyl sulfate (SDS). Cationic surfactants include known alkylated ammonium compounds, and the like. Surfactants which should be avoided are the aforementioned high molecular weight surfactants such as poly vinyl alcohol (PVOH) or TYLOSE® which materials are complicated by the aforementioned problems and disadvantages. Preferably the amount of surfactant used is minimized to minimize possible complications of removing residual surfactant from the particles or from interference with the charging or fusing properties of the finished toner particles.

The surfactant or emulsifying agents can be employed in varying amounts providing that adequate emulsification is achieved. In embodiments, the emulsifying agents are present in an amount of from about 0.001 to 6.0 weight percent, and preferably from about 0.002 to about 1.0 weight percent, based on total monomer to be polymerized in a given growth step.

The emulsifier system used in subsequent particle growth steps may alternatively be a combination of one or more surfactants selected from the group of anionic, cationic, non-ionic, or amphoteric class of surfactants.

A listing of other suitable emulsifiers and detergents which can be used in the present process is printed in the book "McCutcheon's Emulsifiers and Detergents 1981 Annuals", the disclosure of which is incorporated by reference herein in its entirety.

Chain transfer agents may be optionally selected for use in embodiments of the present invention. These agents or compounds are used to control molecular weight properties and molecular weight distributions of the product resins. An effective concentration of a chain transfer agent that is generally employed is, for example, from about 0.005 to about 10 percent by weight, and preferably from about 0.1 to about 2 percent by weight of the monomers polymerized in a given particle growth step, and include for example, alkyl thiols, including dodecanethiol, butanethiol, isooctyl-3-mercaptopropionate (IOMP), 2-methyl-5-t-butylthiophenol (THIO p-TBT), carbon tetrachloride, carbon tetrabromide, and the like.

Figure 1:
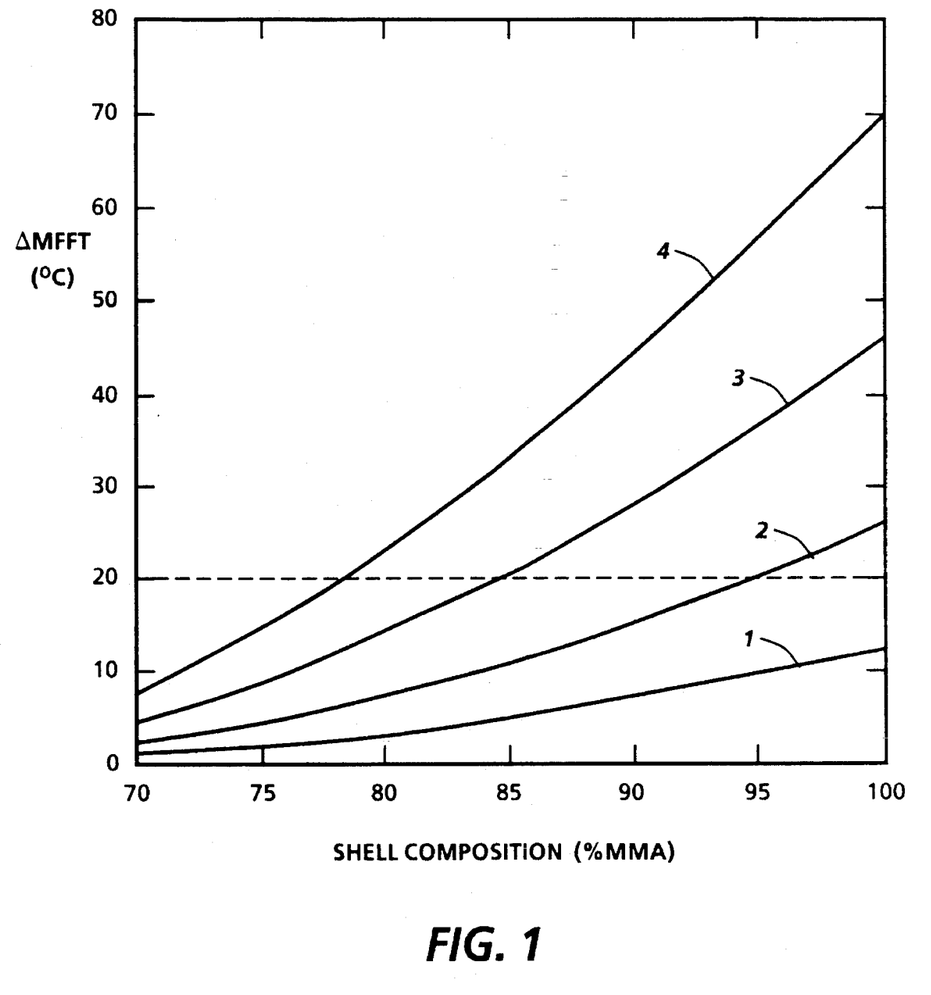
FIG. 1 is a plot of the change in minimum film forming temperature (MFFT) or ΔMFFT versus the shell composition for four exemplary encapsulated toner compositions having approximately the same particle size properties but differing in the methylmethacrylate/butyl acrylate (MMA/BA) composition of the shell copolymer (1 through 4) of the present invention.

In encapsulated particle preparation embodiments of the present invention, a preferred embodiment resides in having a shell polymer resin that is different from the core polymer by having a $T_g$ that is separated by about 20° C. As indicated in FIG. 1, by increasing the amount or percent by weight or relative weight content of methylmethacrylate (MMA) of the shell composition coated onto, for example, nominal 3.0 micron core particles results in larger increases in the minimum film forming temperature or ΔMFFT value. The MFFT value is the minimum film forming temperature of a latex dispersion of the particles, and is believed to correlate well with the blocking temperature. The ΔMFFT value is the change or increase in MFFT caused by adding a shell to the particle. The curves shown in FIG. 1 represent the weight percent of MMA in MMA/BA shell copolymer compositions for four exemplary toners: 1=14.1%; 2=25%; 3=37.5%; and 4=50% MMA. The dotted line at 20° C. represents a preferred target value for ΔMFFT. This behavior was also consistently observed for a variety of toners having comparable particle size properties but with varying shell thicknesses. The increases in ΔMFFT were not as great for the particles with thinner shells, that is, a lower volume fraction shell, since the thin shell of encapsulated toners is sufficiently thin as to not substantially influence the predominant influence of the core polymer on the ΔMFFT properties of the latex particles.

Figure 2:
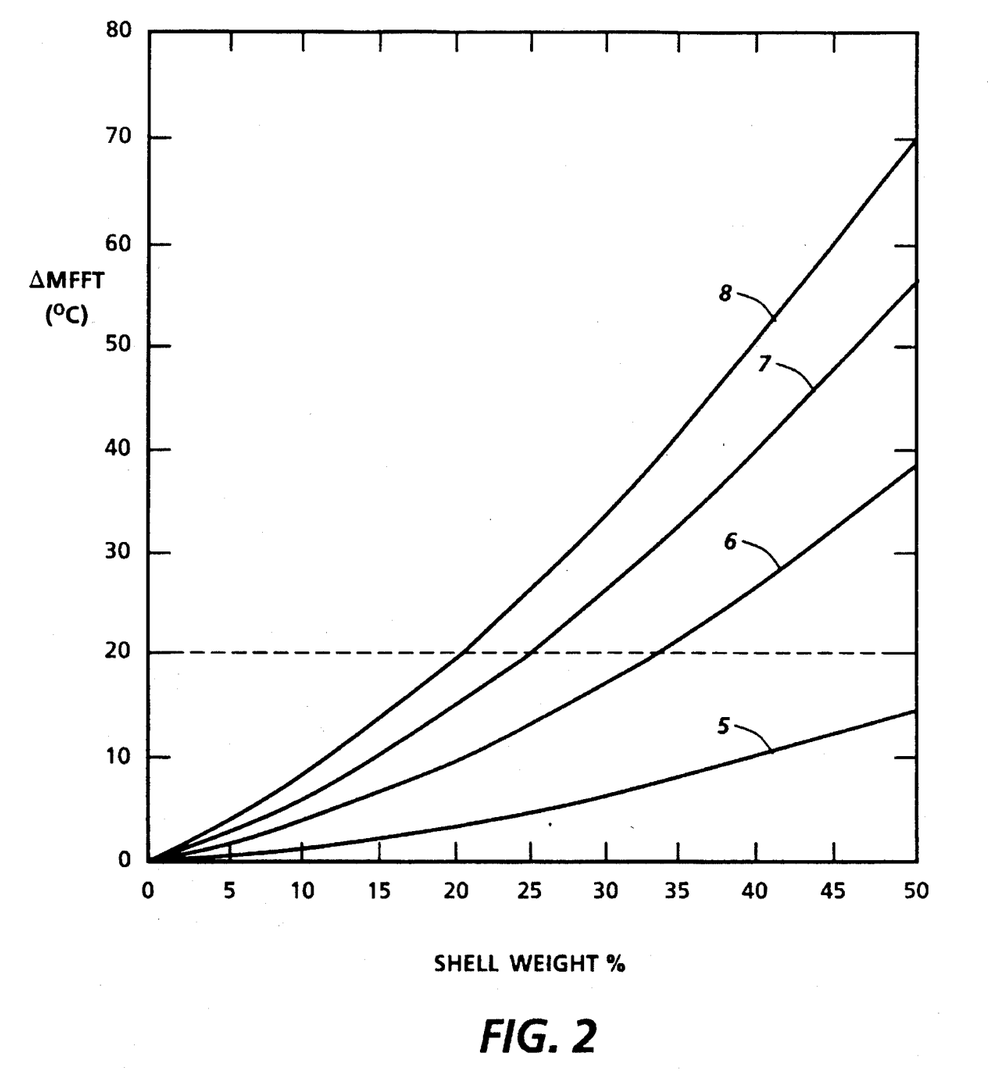
FIG. 2 is a plot of the change in minimum film forming temperature (MFFT) or ΔMFFT versus the relative weight percentage of the shell for four exemplary composite particle compositions having approximately the same particle size properties but differing in the weight percent contribution made by the shell polymer to the total particle weight for encapsulated toner compositions (5 through 8) of the present invention.

A plot of ΔMFFT versus shell weight percent is shown in FIG. 2. The curves cannot be extrapolated to higher shell percentages because the curve is expected to be sigmoidal in shape. The curve begins to level off or inflects at the difference in MFFT for pure shell versus pure core. For shell contents less than 50%, the sigmoidal plot has a shape similar to that shown in the curves. Assuming a desired increase of about 20° C. and a shell as thin as possible, the optimum shell should possess a composition of about 75/25 MMA/BA by weight and would comprise about 20% of the overall particle volume. Thus the curves shown in FIG. 2 represent the weight percent of MMA in shell copolymer compositions of four exemplary toners: 5=75%; 6=87.5%; 7=95%; and 8=100% and illustrate that suitable shell compositions are easily achieved in accordance with the teachings of the present invention. The dotted line at 20° C. again represents a preferred range of shell composition for particularly useful ΔMFFT values. The shell $T_g$ should be about 50° C. or greater. The core may have any $T_g$ less than the shell which provides acceptable fusing and does not smear or block at room temperature after having been fused. Thus for example a ΔMFFT of about 10° to about 40° C. provides acceptable fusing and blocking properties to encapsulated toner particles.

It is known that the blocking temperatures of dry xerographic toners correlate well with with the $T_g$. Likewise, the Minimum Film Forming Temperature (MFFT) of a latex also correlates well with the $T_g$. Therefore, MFFT measurement was used as a predictor of blocking temperature performance. The literature shows that MFFT is relatively more sensitive to comonomer ratio than to particle size. The Minimum Film Forming Temperature was determined with an apparatus similar to ASTM D2354 was used. A heater at one end of a stainless steel bar established a temperature gradient along the bar which was monitored by eight thermocouples. A glass plate covered the bar and nitrogen at a rate of 2.0 liters per minute was passed over the bar to ensure constant humidity. The bar was thermally equilibrated approximately 4 hours. The glass cover was then removed, latexes were placed on the bar along channels grooved on the surface, and the glass cover replaced. After the latex had dried, the MFFT was taken as the point where a clear film had begun to form. This usually occurred about 2 to 3 hours after the lattices were placed on the bar.

In both non-encapsulated and encapsulated particle preparation schemes, SEM photos confirmed that monodisperse copolymer particles with 3.0 micron average diameters were produced. Initially, a monodisperse emulsion polymerized seed particle was produced as described for the non-encapsulated particles. The core was then grown in embodiments, in three sequential seeded polymerizations as shown in Table 2. It is advantageous to monitor the amount of emulsifier used in each growth stage reaction since too much results in secondary particle formation. This must be balanced with the fact that an insufficient amount of emulsifier leads to particle instability. It is desirable to maintain the surface tension, which is indicative of the free surfactant concentration, at above about 50 dynes/cm which is considerably higher than the critical micelle concentration (CMC) of sodium dodecylbenzene sulfonate (SDBS) of 33 dynes/cm.

An optional chain transfer agent, for example IOMP, can be used to eliminate crosslinking which occurs due to chain transfer to butyl acrylate units in the polymer. Table 6 contains molecular weight data for surfactant free seed lattices synthesized with varying amounts of IOMP. Without IOMP, the polymer was not soluble in THF which indicated that crosslinking had occurred. As the amount of chain transfer agent is increased, the molecular weight distribution of the resin narrows. Using IOMP, a wide variety of molecular weights may be attained. IOMP is a more effective chain transfer agent for this system than THIO p-TBT, on both a weight and a molar basis, as shown in Table 5. With chain transfer agent of 1.50 grams, IOMP produced polymer with a $M_n$ 12,000, which $M_n$ was lower than that obtained with THIO p-TBT. In addition, more than 0.375 grams of THIO p-TBT is required to prevent gel formation due to chain transfer to polymer.

Other Copolymer Systems

BA/MMA copolymer particles with a $T_g$ of about 35° C., were produced as core particles and were converted to encapsulated or core-shell particles according to the present invention. Other monomer systems including vinyl acetate and styrene/BA with $T_g$ values near about 35° C. were also prepared. These monomers have different hydrophilicities and provide additional advantages for seed particle latex preparation and subsequent seeded growth reactions, such as low cost, particle size uniformity, and rheological properties.

Shell Formation

A requirement for the shell polymer resins of the shell encapsulated core particles of the present invention is that the shell have a higher $T_g$ than the core. To eliminate potential incompatibilities between the core and the shell resins, the shell can be made from the same monomers as the core but in different amounts to afford the desired differential between the shell and core resin $T_g$ values. To address the issues of shell $T_g$ and shell thickness on toner particle blocking performance, shells of varying compositions and thicknesses were prepared by separately growing shell coatings of various known $T_g$ values and various thicknesses onto the surface of nominally 3.0 micron diameter core particles in surfactant free semi-continuous reactions. So that the shell resin will have a higher $T_g$ than the corresponding core resin, the shell resin should contain larger relative amounts of MMA than the MMA weight percentages in the core resin. Thus, in encapsulated core particle examples, shells having 75:25 to 100:0 ratios of MMA/BA versus cores having a ratio of 63.7:36.3 MMA/BA were prepared. Since MMA is slightly water soluble, there is an increased likelihood of secondary particles formation. Thus, the shell addition reactions using large amounts of MMA are preferably performed in the absence of emulsifier. IOMP or other suitable chain transfer agents may be added to eliminate or minimize crosslinking processes that may occur due to chain transfer to BA units in the absence of a chain transfer agent. Thus, the chain transfer agent (IOMP)/BA ratio is preferably kept nearly constant during shell formation polymerizations. To enhance the in situ stability of the particles, the shell addition polymerization reactions were conducted at about 70° C. To compensate for the decreased temperatures, 2,2'-azobis(2,4 dimethylvaleronitrile) an azo based initiator with a shorter half-life was used in amounts similar to those used in other AIBN initiated seeded reactions. The monomer was added slowly, at a rate of about 1 mL per minute for an exemplary 500 mL reaction, to ensure starve fed conditions as well as reduce the possibility of secondary nucleation.

The aforementioned particle coloration principles and procedures used for emulsion polymerized particles are equally applicable to the core-shell particles described above.

The pigmented or unpigmented polymeric particles obtained have an volume average particle diameter of from about 0.1 micron to about 10 microns as measured by, for example, an Coulter Counter Multisizer II or by Joyce-Lobel Mark III disc centrifuge in combination with light scattering data. Electron microscopy can be used to monitor for the appearance of secondary particle populations.

The core-shell resin particles prepared in embodiments of the present invention can be selected so that the resulting toner particles, colored or colorless, are comprised of core and shell polymer resins that possess refractive indices which are about the same or identical. There are several important advantages associated with matching the refractive index values of the core and skill resins, for example, enhanced color fidelity and transparency of color prints made from toner particles of the present invention.

The finely divided toner particles prepared by processes of the present invention are substantially spherical in shape, have smooth particle surface properties and appearances, and may be optionally treated with surface additives to enhance development properties and performance. The surface additives are comprised of fine powders of conductive metal oxides, metal salts, metal salts of fatty acids, colloidal silicas, titanates, quaternary ammonium salts, zwitterionic salts, metal complexes, organometallic complexes, or mixtures thereof.

Other surface additives having charge directing or control properties comprise a mixture of a colloidal silica or titanate, and an organoaluminum, organoboron, organozinc, organochromium complex of a salicylic acid, a catechol, and the like, and mixtures thereof. Charge additives and surface additives for use in toner compositions are described, for example, in U.S. Pat. No. 5,256,514, the disclosure of which is incorporated herein by reference in its entirety.

Charge control additives for regulating the charging properties of the in situ toner particles prepared in the present invention may be added to the surface of the dry developer particles by, for example, roll or cone milling, or they may be adsorbed in or on the surfaces of the liquid dispersed particles during their formation, and preferably in the surface of the outer most coating or layer so as to have the greatest concentration and influence in the charging properties of the resulting particles.

The charge control director additives used in liquid developers typically are inverse micelles used to facilitate particle charging and are comprised of quaternary ammonium salts which are often polymeric in nature, conductive metal oxides, metal and organometallic salt, and the like.

The following examples are being submitted to further define various species of the present invention. These examples are intended to be illustrative only and are not intended to limit the scope of the present invention. Also, parts and percentages are by weight unless otherwise indicated.

Methyl methacrylate (MMA), butyl acrylate (BA) and ammonium persulfate (APS) were obtained from Aldrich. Azobisisobutyronitrile (AIBN) was obtained from Poly-Sciences Inc., and 2,2'-azobis(2,4-dimethylvaleronitrile) (VAZO 52) from dupont Chemicals. Isooctyl-3-mercaptopropionate (IOMP) and 2-methyl-5-t-butyl-thiophenol (THIO p-TBT) were received from Evans Chemetics (W. R. Grace & Co.) and Hoechst Celanese, respectively. These chemicals were used without further purification. Deionized water was used in all reactions. The MMA/BA (80/20 by weight ratio; with a theoretical $T_g$ of 55° C.) non-encapsulated copolymer particles were made at 30% solids by semi-continuous emulsion polymerization processes, as described below.

EXAMPLE I

Seed Production

The initial reaction involves the production of monodisperse seed particles which are suitable for subsequent seeded polymerizations. A glass reactor vessel equipped with ports for nitrogen, condenser, stirring and monomer introduction was maintained in a water bath at 80° C. Prior to polymerization, the reactor vessel was charged with water (70 weight percent of the total) and then under stirring at a rate of 200

RPM, the system was purged with nitrogen for at least 15 minutes. The MMA (120.0 g), BA (30.0 g) and IOMP (2.60 g) were weighed out in the amounts listed in Table 1. They were then mixed together until they were completely dissolved. Ammonium persulfate (1.00 g) was weighed and added to the reactor. The monomer mixture was fed continuously to the reactor at a rate of 0.75 mL/min using a QSY-1 model pump. The nitrogen purge was reduced to a slow trickle to maintain a small positive pressure. To ensure rapid incorporation of the monomer into the reaction mixture and prevent monomer pooling, the stirrer was kept near the surface of the latex throughout the reaction. After monomer addition was complete, the reaction was allowed to post react for at least one hour. The reactor was then cooled in air and the latex filtered through cheesecloth. The monodisperse latex had a particle size of 401 nm, and a solids content of 30.

EXAMPLE II

Starve Fed Growth-Particle Buildup from 401 nm to 800 nm

In this first seeded step, the particle diameter was doubled which corresponds to a volume increase of eight times. This step differed from step 1 in that it was a seeded reaction and therefore did not involve any nucleation. So as to prevent possible secondary nucleation, the oil soluble AIBN was used as the initiator instead of the water soluble ammonium persulfate. Without 'insitu' stabilization as in Example I, the anionic surfactant, sodium dodecyl benzene sulfonate (SDBS or DS-10) can optionally be added to stabilize the particles. In this example, SDBS(DS-10) was not added, although Table 1 shows it was used in EXAMPLES III to V.

The seed latex of Example I (75 g at 30% solid) and precharge water (350 g) were charged to the 80° C. reactor prior to polymerization with an accompanying nitrogen purge. The stirring speed was 150 RPM. The MMA (120.0 g), BA (30.0 g) and IOMP (2.60 g) were weighed out and mixed as in Example I to give a feed monomer mixture. The majority of the AIBN (0.95 g) was then added to the monomer mixture while the remainder (0.05 g) was added rapidly to the reactor so that the polymerization did not experience an incubation period. The monomer mixture was then fed continuously at a rate of 0.75 mL/min to the reaction mixture. The time of post reaction was at least one hour and the final particle size was 800 nm.

EXAMPLE III

Particle Growth-Particle Buildup from 800 nm to 1.54 microns

The seed latex of Example II (100 g at 30% solid) and 100 g of water were charged to the reactor prior to polymerization with the accompanying nitrogen purge. The stirring speed was 150 RPM. An emulsifier solution was prepared from 250 mL water with 0.150 g SDBS. The MMA (120.0 g), BA (30.0 g) and IOMP (2.60 g) were weighed out and mixed as in Example I. This mixture was then slowly added to the emulsifier solution so as to form a single phased preemulsion. Constant stirring of the feed was required to prevent phase separation of the pre-emulsion. The majority of the AIBN (0.95 g) was then added to the pre-emulsion while the rest (0.05 g) was added to the reactor. The pre-emulsion was then fed continuously to the reaction mixture at a monomer addition rate of 0.47 mL/min (1.25 mL/min pre-emulsion). The time of post reaction was at least one hour and the final particle size was 1.54 microns.

This buildup step was very similar to Example II except that the larger sized seed obtained from Example II was used. The surface area increase in this third step was not as large as that of the second step, and a small amount of SDBS was added to maintain stability.

EXAMPLE IV

Particle Buildup from 1.54 microns to 2.81 microns

This growth in buildup step was very similar to Example III except that the larger sized seed particle obtained from Example III was used. As the surface area increase in this step was not as large as that of the previous step, the amount of SDBS used was less (0.120 g). The particle size after this step was 2.81 microns.

EXAMPLE V

Particle Buildup from 2.81 microns to 3.52 microns

This buildup step was very similar to Example IV. As the surface area increase in this third step was not as large as that of the second step or third step, the amount of SDBS used was less (0.035 g). Particles of 3.52 microns diameter were produced in this step which was similar to the previous seeded reactions. The reaction was terminated early when a small ball of coagulum was observed. Coagulum indicates the occurrence of either secondary particle formation or latex instability, either of which can degrade the particle size distribution. The amounts shown in Table 1 refer to weights of ingredients added.

Characterization

Particles larger than 1.50 microns were added to an electrolyte solution and analyzed using 256 channels on a Coulter Counter Multisizer II. The sizes and distributions were calculated on an interfaced Personal Computer using a program written in QuickBASIC. Particles smaller than 1.50 microns were analyzed using a Joyce-Lobel Mark III disc centrifuge with water as the spin fluid. A Brookhaven Instruments Disc Centrifuge Particle Size Program calculated particle sizes and distributions from data obtained from the light scattering detector. All particle size distributions in this buildup series were monodisperse, reference Table 2.

The Scanning Electron Microscopy (SEM) was done on a Hitachi S-570 Scanning Electron Microscope at an accelerating voltage of 15 kV. The samples were dried on a metal stub and then coated with gold prior to viewing. When looking for secondary particle populations, it was found that the edge of the drop was the best place to look, since smaller particles tended to congregate at the edges.

TABLE 1

| | Example Reactants (weight in grams) | | |
| --- | --- | --- | --- |
| EXAMPLE | Seed Source Employed & Weight | Precharge $H_2O$/APS/AIBN | Feed Composition (MMA/ BA/ IOMP/ AIBN/ SDBS/$H_2O$) |
| I | none | 350/1.00/0.00 | 120.0/30.0/2.60/ 0.00/0.00/0 |
| II | EX I (75) | 350/0.00/0.050 0.95/0.00/0 | 120.0/30.0/2.60/ |
| III | EX II (100) | 100/0.00/0.050 0.95/0.150/250 | 120.0/30.0/2.60/ |
| IV | EX III (100) | 100/0.00/0.050 0.95/0.120/250 | 120.0/30.0/2.60/ |
| V | EX IV | 50/0.00/0.050 | 50.8/12.7/1.10/ |

TABLE 1-continued

| | Example Reactants (weight in grams) | | |
|---|---|---|---|
| EXAMPLE | Seed Source Employed & Weight | Precharge H$_2$O/APS/AIBN | Feed Composition (MMA/ BA/ IOMP/ AIBN/ SDBS/H$_2$O) |
| | (200) | 0.38/0.035/106 | |

The first step (EXAMPLE I) in the particle preparation and reaction series was the production of monodisperse seed particles to be used in the subsequent seeded growth stages Examples II through V. No surfactant was used in this reaction since the ammonium persulfate initiator used provided more than ample stabilization through charged initiator residue $SO_4^-$ or $SO_3^-$ groups on the polymer particle surface. These groups may be attached to polymer chains or they may be the end group of low molecular weight material which acts as the aforementioned 'in-situ'surfactant. With no additional surfactant added, fewer and consequently larger particles are produced. While the main criterion for the seed particles is to be monodispersed, a large initial seed is not undesirable since larger seeds will require fewer growth steps to reach the final desired particle size.

In embodiments, either ammonium persulfate or azobiscyanovaleric acid (ACVA; at pH 8) can be used as initiators. With ACVA, the monodispersed particles produced were larger than those produced using ammonium persulfate. In embodiments, it may be more advantageous from a surface chemistry and/or performance perspective to have, for example, carboxylate group stabilization rather than sulfate group stabilization and which carboxylate stabilization can be achieved by appropriate selection of free radical initiators and surfactant stabilizers.

Seeded Reactions

In embodiments, the water soluble initiator, ammonium persulfate could not be used exclusively for reactions beyond the formation of the initial seed particles because of the high degree of stabilization offered by sulfate end groups. This increased the likelihood of secondary particle formation which destroys the particle monodispersity.

The incipient polymeric chains or oligomeric radicals leading to first generation seed latex particles are charge stabilized by the sulfate end group and resist coalescence onto the other already formed seed particles. In embodiments, it is preferable to use an oil soluble initiator such as AIBN in all seeded reactions subsequent to the formation of the primary seed latex particles. This concentrates the locus of polymerization within the particles as well as keeps the ionic strength of the continuous medium to a minimum, thereby increasing the stability of the latex. Therefore, the addition of water soluble inorganic salts, such as potassium iodide and the like, to the aqueous continuum is preferably avoided. Any oligomers produced in the water phase are incorporated into the main seed particles as they will not have aqueous phase stabilizing ionic end groups. In the absence of these stabilizing end groups, all stabilization is provided by emulsifier surfactants which concentration is carefully monitored so as not to promote formation or stabilization of secondary particles. A preferred surfactant used in these particle growth reactions was sodium dodecyl benzene sulfonate (SDBS).

In exemplary seeded reaction embodiments, the seed was diluted with water in the precharge before the addition of the preemulsion. This was done to decrease the amount of free surfactant in the system. Without dilution, the production of secondary particles is more likely. in addition to diluting the seed, the amount of seed used is believed to be important. The smaller the amount of seed used, the more likely secondary particles are to form since there is insufficient surface area to mop up monomer or any precursor particles that may have formed. If the amount of seed particles used is too large, the buildup steps will be slow and inefficient. Thus there is a lower limit to the surface area of seed per unit volume of water that must exist if secondary particles are to be avoided. As an approximate guide (a) an approximate amount of SDBS (molecular weight of 348) equal to $1.5 \times 10^{-6}$ moles/m$^2$, and (b) an initial loading of seed particles that gave greater than 0.6 m$^2$/mL of latex provided suitable concentrations.

Polymer Properties

Molecular weight data from Examples I to V is summarized in Table 2.

TABLE 2

| | Particle Characterization Data | | | |
|---|---|---|---|---|
| EXAMPLE | Particle Size D$_n$ | D$_w$/D$_n$ | M$_n$ | % Solids |
| I | 401 nm | 1.018 | 15,800 | 29.9 |
| II | 800 nm | 1.011 | 23,600 | 29.2 |
| III | 1.54 micron | 1.010 | 14,900 | 30.1 |
| IV | 2.81 micron | 1.002 | 18,200 | 29.7 |
| V | 3.52 micron | 1.002 | 15,850 | 28.3 |

A low melting core copolymer of theoretical T$_g$=35° C. was prepared from a 63.7:36.3 weight ratio of MMA/BA. Particles were grown in several steps, then encapsulated by a variety of shells of different MMA/BA ratios, from about 75% to 100% by weight MMA. The effect of shell thickness and shell composition on the blocking temperature was mapped out. The MMA/BA copolymer particles were made at 30% solids by semi-continuous emulsion polymerization processes.

EXAMPLE VI

Seed Production

This reaction provided monodisperse seed particles which were suitable for subsequent seeded polymerizations as in Example I. The MMA (95.55 g), BA (54.45 g) and IOMP (0.75 g) were weighed out in the amounts listed in Table 3, then mixed until completely miscible in each other. The ammonium persulphate (1.00 g) was then weighed and added to the reactor. Thee monomer mixture was then fed continuously to the reactor at a rate of 0.75 mL/min using a QSY-1 model pump. The nitrogen purge was then reduced to a slow trickle so that a small positive pressure was maintained. To ensure rapid incorporation of the monomer into the reaction mixture and prevent monomer pooling, the stirrer was kept near the latex surface throughout the reaction. After the monomer addition was complete, the reaction was allowed to post react for at least one hour. The reactor was then removed from the bath, cooled and then filtered through cheese cloth. In a variety of similar reactions, the lattices had an average diameter particle size of between 450 and 500 nm and a particle size diameter distribution polydispersity (D$_w$/D$_n$) of 1.01 and a solids content of 30%.

EXAMPLE VII

Starve Fed Growth Buildup from 468 to 834 nm

In the particle seeded polymerizations, in Table 3, the pre-emulsion was comprised of BA, MMA, IOMP, AIBN, and sodium dodecyl benzene sulphonate (SDBS), and was added continuously via a QSY-1 FMI pump to the reactor charge which contained diluted polymer seed and a small amount of AIBN so that the polymerization did not experience an incubation period. In this first seeded growth or enlargement step, the particle diameter was approximately doubled which corresponds to a volume increase of about eight times. This step differed from Example VI in that it was a seeded reaction and therefore did not involve any nucleation. To minimize possible secondary nucleation, the oil soluble AIBN was used as the initiator instead of the water soluble ammonium persulphate. Sodium dodecyl benzene sulphonate (SDBS) was added to stabilize the particles. The seed latex of Example VI (100 g at 30% solid) and 100 g of water were charged to the reactor prior to polymerization with the accompanying nitrogen purge. The stirring speed was 150 rpm. The SDBS (0.15 g) was dissolved in the remaining water (250 g). The MMA (95.5 5 g), BA (54.45 g) and IOMP (0.75 g) were weighed out and mixed as in Example VI. This mixture was then slowly added to the SDBS solution so as to form a homogeneous preemulsion mixture. Constant stirring was required to prevent the preemulsion from separating. The majority of the AIBN (0.95 g) was then added to the pre-emulsion while the remainder (0.05 g) was added to the reactor. The latter amount was added so that the polymerization did not experience an incubation period. The pre-emulsion was then fed continuously at a rate of 1.0 mL/min to the reaction mixture. The time of post reaction was at least one hour and the final particle size was close to 850 nm with a monodispersity ($D_w/D_n$) of 1.01.

EXAMPLE VIII

Starve Fed Growth Buildup from 834 nm to 1.6 microns

This buildup step was very similar to Example VI except that the larger sized seed obtained from Example VII was used. The particle size after this step was about 1.60 microns and very monodisperse ($D_w/D_n=1.01$).

EXAMPLE IX

Starve Fed Growth Particle Buildup from 1.6 microns to 2.9 microns

Particles of 2.9 microns diameter were produced in this step which was similar to the previous seeded reactions. The relative amounts of reactants used were the same as in Example VIII although the rate of addition of preemulsion was only 2.5 mL/min.

EXAMPLE X

Shell Formation

All shell addition reactions were surfactant free, seeded reactions, using 3.0 micron average core particles with a composition of 63.7/36.6 MMA/BA by weight. The reaction temperature was 70° C. and the initiator used was 2,2'-azobis(2,4 dimethylvaleronitrile) otherwise known as Vazo-52. In the example that follows, the shell composition was 75/25 MMA/BA by weight and comprised about 20% by volume of the total particle volume. The amount of IOMP was adjusted so that the [BA]/[IOMP] ratio was about constant. The seed latex obtained from Example IX (200 g) was charged along with water to the reactor vessel which was kept in a bath at 70° C. The MMA (11.25 g), BA (3.75 g) and IOMP (0.052 g) were mixed, then VAZO-52 initiator (0.095 g) was added. Upon addition of 0.005 g VAZO-52 to the pre-charge, the monomer/initiator mixture was feed to the reactor at a rate of 0.15 mL/min. After the addition was complete, the reaction was allowed to react further for at least one hour.

EXAMPLES X–XVI

The results which are summarized in Tables 5 and 6 are described previously in the text.

TABLE 3

Example Reactants (amounts in grams)

| EX-AMPLE | Seed Employed & Weight | Water Pre-charge | Initiator & Weight | Feed Composition (MMA/BA/IOMP/AIBN/DS-10/H$_2$O) |
|---|---|---|---|---|
| VI | none | 350 | APS (1.00) | 95.55/54.45/0.75/0.00/0.00/0 |
| VII | Example VI (100) | 100 | AIBN (0.050) | 95.55/54.45/0.75/1.00/0.150/250 |
| VIII | Example VII (100) | 100 | AIBN (0.050) | 95.55/54.45/0.75/1.00/0.200/250 |
| IX | Example VIII (400) | 400 | AIBN (0.200) | 382.2/217.8/3.00/3.80/0.700/1000 |

TABLE 4

Sequence of Seeded Emulsion Polymerizations

| EXAMPLE | VI | VII | VIII | IX |
|---|---|---|---|---|
| Initiator | APS | AIBN | AIBN | AIBN |
| Particle Size (microns) | 0.468 | 0.834 | 1.60 | 2.93 |
| Secondary Particles detectable by SEM? | No | No | No | No |

TABLE 5

Molecular Weight of Seed Resins Using Chain Transfer Agent (IOMP)

| EXAMPLE | X | XI | XII | XIII |
|---|---|---|---|---|
| Weight IOMP | 0.375 | 0.750 | 1.50 | 3.00 |
| Moles IOMP | 0.00172 | 0.00344 | 0.00687 | 0.0137 |
| $M_n$ | 53,550 | 38,330 | 25,200 | 13,400 |
| $M_w$ | 187,300 | 90,000 | 48,750 | 24,200 |
| MWD = $M_w/M_n$ | 3.50 | 2.35 | 1.935 | 1.805 |

TABLE 6

Molecular Weight of Seed Resins Using Chain Transfer Agent (THIO)

| EXAMPLE | XIV | XV | XVI |
|---|---|---|---|
| Weight THIO p-TBT | 0.375 g | 0.750 g | 1.50 g |
| moles THIO p-TBT | 0.00208 | 0.00416 | 0.00832 |
| $M_n$ | THF insoluble | 50,000 | 31,200 |
| $M_w$ | THF insoluble | 151,600 | 73,300 |

TABLE 6-continued

Molecular Weight of Seed Resins
Using Chain Transfer Agent (THIO)

| EXAMPLE | XIV | XV | XVI |
|---|---|---|---|
| MWD = $M_w/M_n$ | THF insoluble | 3.03 | 2.35 |

TABLE 7

Delta MFFT Values of Core-Shell Lattices as a
Function of Weight Percent Shell and Weight Percent
MMA (C; core only control MFFT - ca. 37–39° C.)

| Shell Wt. % | 75% MMA Shell | 87.5% MMA Shell | 95% MMA Shell | 100% MMA Shell |
|---|---|---|---|---|
| 14.1 | 1.4 | 3.7 | 8.0 | 6.6 |
| 25.0 | 3.4 | 16.7 | 21.3 | 32.2 |
| 37.5 | 7.4 | 35.3 | 33.0 | 37.6 |
| 50.0 | 11.4 | 24.9 | >70 | >70 |

The above mentioned patents and publications are incorporated by reference herein in their entirety.

Other embodiments and modifications of the present invention may occur to those skilled in the art subsequent to a review of the information presented herein; these embodiments and modifications, as well as equivalents thereof, are also included within the scope of this invention.

What is claimed is:

1. An in situ process for the preparation of resin particles comprising:
   a) preparing a seed particle latex by aqueous emulsion polymerization of a first mixture comprised of at least one monomer, an optional chain transfer agent, and a water soluble free radical initiator, wherein the reaction of the free radical initiator and monomer produces oligomeric radicals which provide in situ stabilization to the resulting first generation seed particles;
   b) optionally diluting the first seed particle latex with water;
   c) heating and starve feed adding to the first generation seed particles a second mixture comprised of at least one monomer, an organic soluble free radical initiator, an optional chain transfer agent, an optional water soluble free radical initiator, and an optional surfactant to form a third mixture comprised of second generation seed particles;
   d) heating and starve feed adding to the second generation seed particles additional said second mixture to form a fourth mixture comprised of third generation seed particles;
   e) heating and starve feed adding to the third generation seed particles additional said second mixture to form a fifth mixture comprised of fourth generation seed particles; and
   f) heating and starve feed adding to the fourth generation seed particles additional said second mixture to form a sixth mixture comprised of fifth generation seed particles, wherein the first through the fifth generation seed particles have a narrow volume average particle size dispersity.

2. A process according to claim 1 wherein the heating and starve feed adding step c) is sequentially repeated N times to provide (N+2)th generation seed particles which have a particle size corresponding to a volume increase of from about 2 to about 500 times greater than the preceding generation of seed particles and where N is a number from 1 to about 10.

3. A process according to claim 1 wherein the starve feed addition of said second mixture to the first mixture is at a rate of about 0.1 to about 25 grams per kilogram of reactor content per minute.

4. A process according to claim 1 wherein the addition of the second mixture is starve fed to subsequent generation seed particles at a rate of about 1 to about 10 grams per kilogram of reactor content per minute.

5. A process according to claim 1 wherein the monomer or monomers contained in the second or subsequently added mixtures can be the same as or different from the monomer or monomers of the first mixture.

6. A process according to claim 1 wherein the first generation seed particles have a diameter average of about 30 to about 2,000 nanometers.

7. A process according to claim 1 wherein the second generation particles have a diameter average of about 600 to about 10,000 nanometers.

8. A process according to claim 1 wherein the third generation particles have a diameter average of about 1,000 nanometers to about 2.0. micrometers.

9. A process according to claim 1 wherein the fourth generation particles have a diameter average of about 1.0 micrometers to about 30 micrometers.

10. A process according to claim 1 wherein the fifth generation particles have a diameter average of about 2.0 micrometers to about 50 micrometers.

11. A process according to claim 1 wherein each of said particle generations are monodisperse with a volume average dispersity of less than about 1.10.

12. A process according to claim 1 wherein in the resulting particles have a volume average dispersity of about 1.001 to about 1.03.

13. A process according to claim 1 further comprising isolating, washing, and drying the resulting particles.

14. A process according to claim 1 further comprising coloring the resin particles by adding a colorant selected from the group consisting of pigments, dyes, magnetite, carbon black, surface treated derivatives thereof, and mixtures thereof, to said second mixture prior to polymerization.

15. A process according to claim 1 further comprising coloring the fifth generation of particles by heating to above the $T_g$ of the polymeric resin residing on the surface of the particles in the presence of a colorant.

16. A process according to claim 1 further comprising heating seed particles selected from the first to fourth generation particles to above the $T_g$ of the polymeric resin residing on the surface of said particles and adding a pigment or dye to the surface of the softened particles.

17. A process according to claim 1 wherein the resulting resin particles have a $T_g$ of about 40° to about 90° C.

18. A process according to claim 1 wherein the resulting resin particles are non-agglomerating upon drying.

19. A process according to claim 1 wherein the monomer is a free radical reactive olefin compound selected from the group consisting of styrenes, dienes, acrylate esters, vinyl acetates, and mixtures thereof.

20. A process according to claim 1 wherein the number of different monomer types polymerized is from about 2 to about 10.

21. A process according to claim 1 wherein the heating is conducted at a temperature of less than about 100° C.

22. A process according to claim 1 wherein the water soluble free radical initiator is selected from the group consisting of sodium persulfate; potassium persulfate;

ammonium persulfate; hydrogen peroxide; t-butyl hydroperoxide; cumene hydroperoxide; para-menthane hydroperoxide and peroxy carbonates; 4,4'-azobis(4-cyanovaleric acid); 1,1'-azobis(1-methylbutyronitrile-3-sodium sulfonate); 2,2'-azobis(2-amidinopropane)dihydrochloride; 2,2'-azobis(2-amidinopropane)dihydrochloride; 2,2'-azobisisobutyl amide dihydrate; 2,2'-azobis[2-(2-imidazolin-2-yl)propane]dihydrochloride; 2,2'-azobis[2-(5-methyl-2-imidazolin- 2-yl)propane]dihydrochloride; and mixtures thereof.

23. A process according to claim 1 wherein the organic soluble free radical initiator is selected from the group consisting of oil soluble organic peroxides, azobisalkylnitrites, peroxycarbonates, and mixtures thereof.

24. A process according to claim 1 wherein the surfactant is an anionic or cationic surfactant selected from the group consisting of alkyl sulfonates, alkyl aryl sulfonates, condensed naphthalene sulfonates, alkyl sulfates, ethoxylated sulfates, phosphate esters, esters of sulfosuccinic acid, alkyl, aryl, and alkylaryl quaternary ammonium salts, betaines, and mixtures thereof.

25. A process according to claim 1 wherein the surfactant has a molecular weight of from about 50 to about 1,000 and is selected in an amount of 0 to about to 6.0 percent by weight of the total monomer polymerized.

26. A process according to claim 1 wherein the chain transfer agent is selected from the group consisting of dodecanethiol, butanethiol, isooctyl-3-mercaptopropionate 2-methyl-5-t-butyl-thiophenol, carbon tetrabromide, carbon tetrachloride, and mixtures thereof.

27. A toner composition comprising resin particles prepared by the process of claim 1, and optional additives selected from the group consisting of colorants, charge control additives, flow aids, lubricants, and mixtures thereof.

28. A process according to claim 1 wherein the free radical initiator comprises a redox polymerization initiator comprised of a combination of a reducing agent and a peroxide.

29. A process according to claim 1 wherein the fifth generation seed particles have a shell polymer resin with a $T_g$ of from about 50° to about 90° C. and a core polymer resin or resins with at $T_g$ of about 20° to about 50° C.

* * * * *